(No Model.)
G. S. TRACY.
CORN HUSKING AND FODDER CHOPPING MACHINE.
No. 418,325. Patented Dec. 31, 1889.
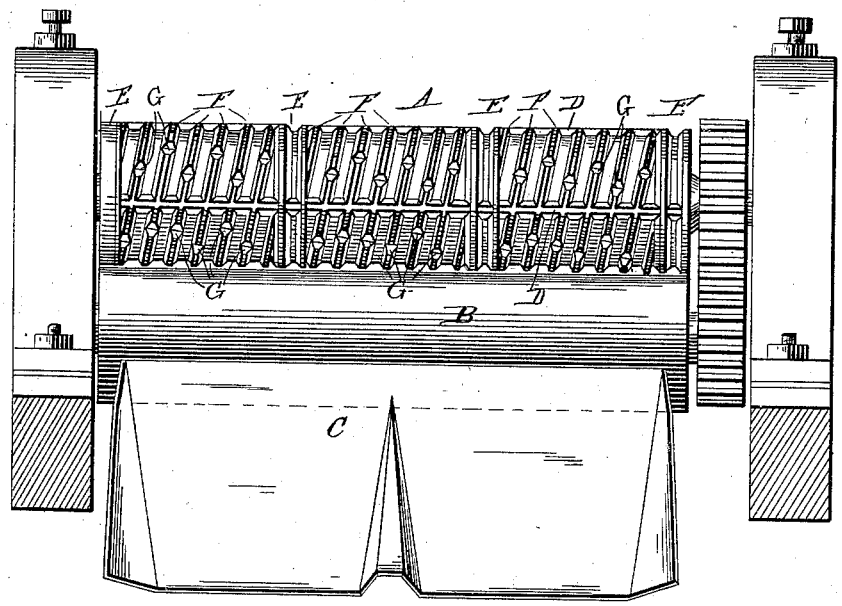
Witnesses
Inventor
George S. Tracy
By
John G. Manahan
Attorney
N. PETERS, Photo-Lithographer, Washington, D. C.

UNITED STATES PATENT OFFICE.

GEORGE S. TRACY, OF STERLING, ILLINOIS, ASSIGNOR OF ONE-HALF TO THOMAS A. GALT, OF SAME PLACE.

CORN-HUSKING AND FODDER-CHOPPING MACHINE.

SPECIFICATION forming part of Letters Patent No. 418,325, dated December 31, 1889.

Application filed June 26, 1889. Serial No. 315,668. (No model.)

*To all whom it may concern:*

Be it known that I, GEORGE S. TRACY, a citizen of the United States, residing at Sterling, in the county of Whiteside and State of Illinois, have invented certain new and useful Improvements in Corn-Husking and Fodder-Chopping Machines; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

My invention has reference to certain improvements in corn-husking and fodder-chopping machines, and pertains more especially to the novel peripheral conformation of one of the rollers which feed the fodder and at the same time remove the ear.

Heretofore the objection to this class of machines has been that the cornstalks were not forced through the feeding and snapping rollers with sufficient uniformity or rapidity. The stalks being at times somewhat green and at other times damp or wet, the tendency was to stick and slip between said rollers, thus interrupting the desired steady and regular passage of the corn between such rollers.

My invention consists in the peripheral conformation of one of the feed-rollers, which will first be described, and then pointed out in the claims.

As my invention is limited to the improvement of the feed-rollers and the residue of the machine can be of any of the well-known forms, I do not deem it necessary to show or describe the entire machine or the remaining parts any more fully than will be necessary to make the character, location, and operation of my invention intelligible.

The drawing represents an elevation of the front or outer side of the feed-rollers referred to.

A is the upper feed-roller, and B the lower one. These rollers are placed parallel with each other transversely of the machine, between the feed-hopper C and cutting-knife. (Not shown.) The rollers A and B are respectively journaled to the frame D and driven at any desired velocity by suitable gear communicating in any of the usual modes with the driving-shaft of the machine. The fodder, with the unhusked ears thereon, is placed in the hopper C in front of said rollers, and by the action of the rollers A and B drawn between the latter. In the passage of the fodder between the rollers A and B the ears of corn thereon are snapped from the fodder and dropped back into the hopper C, where the husks are stripped from the ears by suitable husking-rollers seated longitudinally in the bottom of said hopper. As the fodder or stalks are forced between the rollers A and B they are crushed to any desired degree and are delivered directly into a suitable cutting-knife, which is journaled transversely of the machine directly behind said feed-rollers and adapted to chop the fodder into pieces of any desired size as it is delivered to said cutter by said feed-rollers. The lower feed-roller B is of a smooth exterior. The adjacent sides of the rollers A and B move in the same direction from the feed-hopper toward the cutting-knife. The distance between the rollers A and B is adjustable in any suitable mode, so that the degree of crushing by said rollers can be regulated as desired.

The periphery of the roller A has the following conformation: There are four equidistant longitudinal ribs D and four annular equidistant ribs E. Between each of the annular ribs E are formed the spiral ribs or threads F, which in the rotation of the roller A tend to move the fodder or stalks somewhat laterally during their transmission, and thereby distribute the same more or less between the adjacent faces of said feed-rollers. The annular ribs E serve as periodic stops for this lateral movement of the fodder and prevent the latter from accumulating at one end of the roller. The longitudinal ribs D serve to give the rollers A an additional bite or grip beyond that afforded by the threads F. In order to enable the threads F to have a tractional or drawing force in addition to their distributing quality, I form therein any desired number of recesses or notches G, which can be formed in such threads at such intervals or frequency as may be desired, being proportioned to the size and velocity of said roller. The notches G are formed with their forward wall rather oblique and their rear wall nearly or quite perpendicular to the periphery of the roller. The sloping wall permits the fodder or stalks to pass up into the notches G, and the abrupt rear wall of said notches readily grasps or engages said stalks and forces them through between said rollers. The roller A, with this special configuration of periphery, I find to be very effective and satisfactory for the purpose intended, its action being uniform and reliable. The different ribs, threads, and notches combined serve to distribute laterally the fodder between the rollers to prevent its accumulation at one side of said rollers and compel a positive uniform movement of the fodder or stalks between said rollers. The notched threads F may be used without the ribs D; but I think the addition of the latter advantageous.

What I claim in this application, and desire to secure by Letters Patent of the United States, is—

1. The combination of the roller B and roller A, the latter provided peripherally with longitudinal ribs D, annular ribs E, and intervening sections of threads F, with engaging notches G therein, substantially as shown, and for the purpose described.

2. In combination with the roller B, the roller A, provided peripherally with annular ribs E, placed at different points between its ends, and threads F, provided with notches G, formed between and leading up to ribs E, whereby the latter serve as intermediate stops for the lateral spread of the fodder effected by said threads, substantially as shown.

In testimony whereof I affix my signature in presence of two witnesses.

GEO. S. TRACY.

Witnesses:
JOHN G. MANAHAN,
ZADOK T. GALT.